(12) United States Patent
Lais et al.

(10) Patent No.: US 8,495,252 B2
(45) Date of Patent: Jul. 23, 2013

(54) IMPLEMENTING PCI-EXPRESS MEMORY DOMAINS FOR SINGLE ROOT VIRTUALIZED DEVICES

(75) Inventors: Eric N. Lais, Tillson, NY (US); Gregory M. Nordstrom, Pine Island, MN (US); Steven M. Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 13/007,800

(22) Filed: Jan. 17, 2011

(65) Prior Publication Data

US 2012/0185632 A1   Jul. 19, 2012

(51) Int. Cl.
*G06F 3/00* (2006.01)
(52) U.S. Cl.
USPC .......... 710/3; 710/1; 710/104; 710/306; 711/203
(58) Field of Classification Search
USPC .......... 710/104, 306, 3, 314, 8, 1; 711/203
See application file for complete search history.

(56) References Cited

U.S. PATENT DOCUMENTS

| | | | | |
|---|---|---|---|---|
| 7,260,664 | B2 * | 8/2007 | Arndt et al. | 710/266 |
| 7,681,083 | B2 | 3/2010 | Arndt et al. | |
| 7,743,189 | B2 * | 6/2010 | Brown et al. | 710/104 |
| 7,958,298 | B2 * | 6/2011 | Deshpande et al. | 710/310 |
| 7,979,592 | B1 * | 7/2011 | Pettey et al. | 710/3 |
| 8,041,871 | B2 * | 10/2011 | Deshpande et al. | 710/310 |
| 8,082,466 | B2 * | 12/2011 | Tanaka et al. | 714/6.3 |
| 8,103,810 | B2 * | 1/2012 | Brown et al. | 710/62 |
| 8,208,396 | B2 * | 6/2012 | Eisenhauer et al. | 370/252 |
| 8,271,707 | B2 * | 9/2012 | Fan et al. | 710/104 |
| 8,341,327 | B2 * | 12/2012 | Baba et al. | 710/316 |
| 8,359,408 | B2 * | 1/2013 | Ganga et al. | 710/10 |
| 8,359,415 | B2 * | 1/2013 | Brown et al. | 710/62 |
| 8,386,654 | B2 * | 2/2013 | Brinkmann et al. | 710/8 |
| 8,386,679 | B2 * | 2/2013 | Nordstrom et al. | 710/104 |
| 2012/0166690 | A1 * | 6/2012 | Regula | 710/104 |
| 2013/0061012 | A1 * | 3/2013 | Turner et al. | 711/159 |

OTHER PUBLICATIONS

PCI-SIG. Single Root I/O Virtualization and Sharing Specification. Revision 1.1. Jan. 20, 2010.*
Intel Corporation. PCI-SIG SR-IOV Primer. An Introduction to SR-IOV Technology. Revision 2.5. Jan. 2011.*
Varma, Anujan. Single Root IOV Endpoint Implementation. 2007.*

* cited by examiner

*Primary Examiner* — Matthew D Spittle
(74) *Attorney, Agent, or Firm* — Joan Pennington

(57) ABSTRACT

A method, system and computer program product are provided for implementing PCI-Express memory domains for single root virtualized devices. A PCI host bridge (PHB) includes a memory mapped IO (MMIO) domain descriptor (MDD) and an MMIO Domain Table (MDT) are used to associate MMIO domains with PCI memory VF BAR spaces. One MDD is provided for each unique VF BAR space size per bus segment connecting a single root IO virtualization (SRIOV) device to the PCI host bridge (PHB). The MDT used with the MDD includes having a number of entries limited to a predefined total number of SRIOV VFs to be configured. A VF BAR Stride, which may be further implemented as a VF BAR Stride Capability Structure, is provided to reduce the number of MDDs required to map SRIOV VF BAR spaces. A particular definition of the MDD is provided to reduce the number of MDDs required to at most one per SRIOV bus segment below a PHB.

26 Claims, 9 Drawing Sheets

IMPLEMENTING PCI-EXPRESS MEMORY DOMAINS FOR SINGLE ROOT VIRTUALIZED DEVICES

FIELD OF THE INVENTION

The present invention relates generally to the data processing field, and more particularly, relates to a method, system and computer program product for implementing PCI-Express memory domains for single root virtualized devices.

DESCRIPTION OF THE RELATED ART

Single root input/output (IO) virtualization (SRIOV) is an emerging adapter technology within the PCI-Express (PCIE) industry. SRIOV capability is a feature of essentially all new PCI-E adapters for Fiber Channel, Ethernet, Infiniband, and Converged Network Adapters (CNA).

U.S. Pat. No. 7,681,083 to Arndt et al., issued Mar. 16, 2010, and assigned to the present assignee, discloses a method, apparatus, and system for isolating input/output adapter error domains in a data processing system, and a mechanism to associate SRIOV adapter PCIE memory with individual PCI functions for detecting or recording error states that affect memory mapped IO (MMIO) transactions to those functions. Errors occurring in one input/output adapter are isolated from other input/output adapters of the data processing system by functionality in a host bridge that connects the input/output adapters to a system bus of the data processing system, thus permitting the use of low cost, industry standard switches and bridges external to the host bridge.

A need exists for an effective mechanism for implementing PCI-Express memory domains for single root virtualized devices.

SUMMARY OF THE INVENTION

Principal aspects of the present invention are to provide a method, system and computer program product for implementing PCI-Express memory domains for single root virtualized devices. Other important aspects of the present invention are to provide such method, system and computer program product substantially without negative effects and that overcome many of the disadvantages of prior art arrangements.

In brief, a method, system and computer program product are provided for implementing PCI-Express memory domains for single root virtualized devices. A PCI host bridge (PHB) includes a memory mapped IO (MMIO) domain descriptor (MDD) and an MMIO Domain Table (MDT) used to associate MMIO domains with PCI memory Virtual Function (VF) Base Address Register (BAR) spaces. One MDD is provided for each unique VF BAR space size per bus segment connecting a single root IO virtualization (SRIOV) device to the PCI host bridge (PHB). An MDD defines a set of MMIO domains that can be associated one-to-one with each unique VF BAR space, and includes a base address register defining the starting address in PCIE memory of a set of contiguous MMIO domains. The alignment of the base address register specifies, for example, as a power of 2 value, the size of the region of PCIE memory encompassing the totality of these contiguous MMIO domains. The MDD includes a programmable register containing an integer value, n, that divides the totality of the PCIE memory address space determined by the Base Address Register into n MMIO domains of size 1/nth of said region size.

In accordance with features of the invention, a MMIO domain table (MDT) is used with the MDD having a size including a number of entries limited to a predefined total number of SRIOV VFs to be configured. The PHB provides a multiplicity, or pool, of MDD hardware elements. The PHB provides a number of MDD hardware elements corresponding minimally to the total number of PCI bus segments for which it is capable of configuring SRIOV VFs multiplied by the number of unique SRIOV VF BAR sizes anticipated to be possible within a practical server implementation. Nominally, each MDD must provide one set of equally-sized MMIO domain per VF BAR size, times the number of VFs utilizing that BAR space size. For example, if the MDD provides only a single MMIO domain per VF, then one MDD of that particular BAR size must be provided for each VF BARn utilizing that size, up to a total of 6 for SRIOV adapters that provide the maximum 6 BARs in 32-bit PCI memory space.

In accordance with features of the invention, the MDD is a hardware element of a PHB suitable for programming by system configuration firmware. An alternative is to provide a predetermined number of MMIO domains within an MDD according to a fixed value, such as the total number of SRIOV VFs, or that number of VFs times 3 or 6, to account for multiple BARs per VF.

In accordance with features of the invention, an enhanced method utilizes a VF BAR Stride Capability implemented within an SRIOV capable adapter to reduce the number of MDDs required to map SRIOV VF BAR spaces. The VF BAR Stride Capability that enables configuration firmware to modify the PF VF $BAR_n$ alignment and offset relative to each other, such that the $BAR_n$ space of every VF, for every $BAR_n$ of every VF is aligned on a particular PCIE memory boundary that can be associated with a single MMIO domain size.

In accordance with features of the invention, a further enhanced method utilizes an MDD which includes a programmable value indicating a number of BAR domains, b_num, which is used to divide the MDD PCI memory region into b_num groups of MMIO domains.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, a system, and a computer program product are provided for implementing PCI-Express memory domains for single root virtualized devices.

Figure 1:
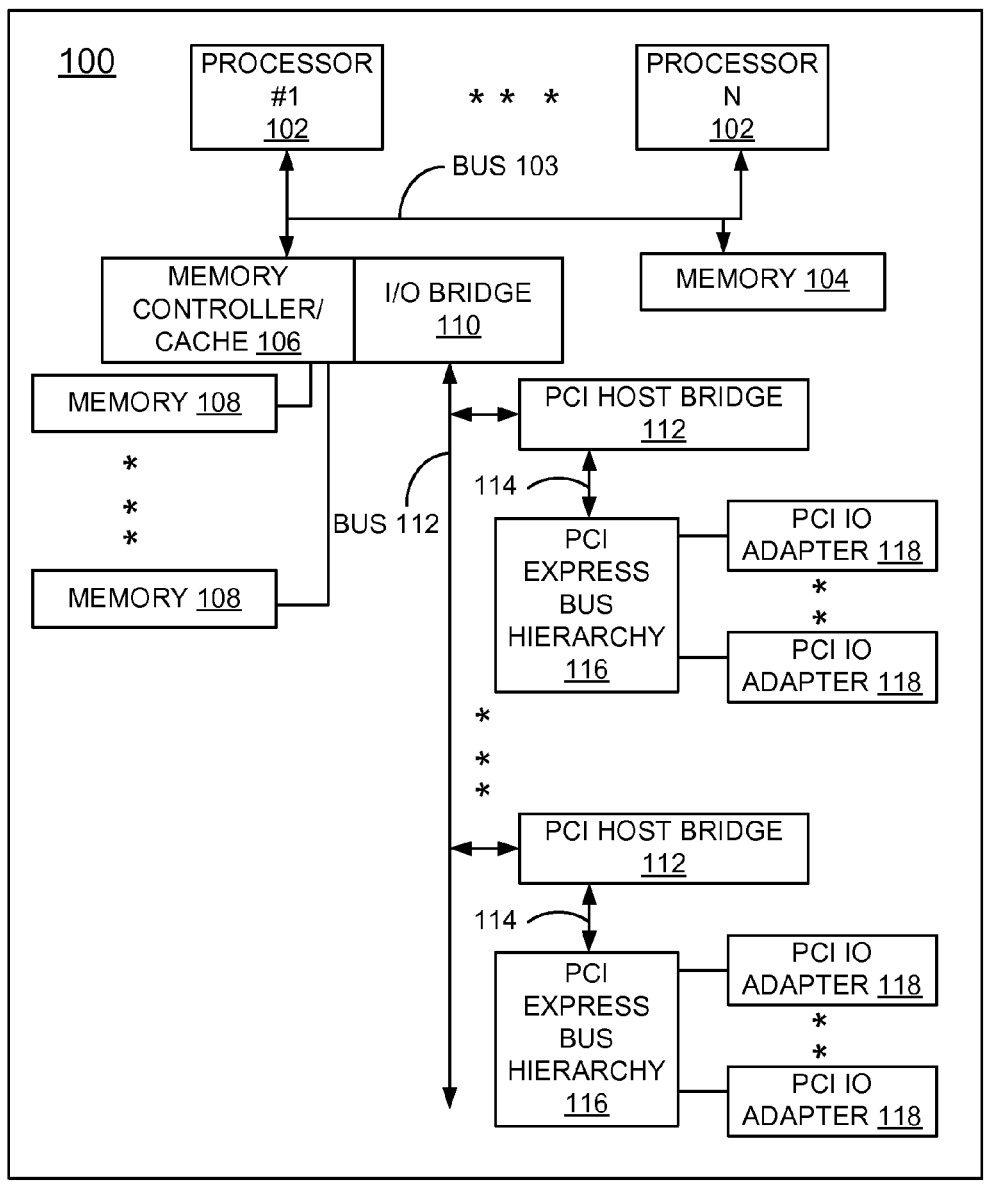
FIGS. 1 and 2 are block diagram representations illustrating an example computer system for implementing PCI-Express memory domains for single root virtualized devices in accordance with the preferred embodiments.

Referring now to the drawings, in FIG. 1 there is shown a computer system generally designated by the reference character 100 for implementing methods for implementing PCI-Express memory domains for single root virtualized devices in accordance with the preferred embodiment. Computer system 100 includes a plurality of main processors 1-N, 102 coupled by a system bus 103 to a memory 104. Computer system 100 includes a memory controller/cache 106 coupled to a plurality of local memories 108. Computer system 100 includes an I/O bridge 110 coupled by an I/O bus 112 to a plurality of PCI host bridge 112. Each PCI host bridge (PHB) 112 provides an interface for a respective PCI bus 114 to connect to I/O bus 112 and a respective PCI-Express Bus Hierarchy 116 to a plurality of PCI input/output (IO) adapters 118. The computer system 100 is, for example, logically partitioned such that different PCI IO adapters 118 may be assigned to different logical partitions.

Figure 2:
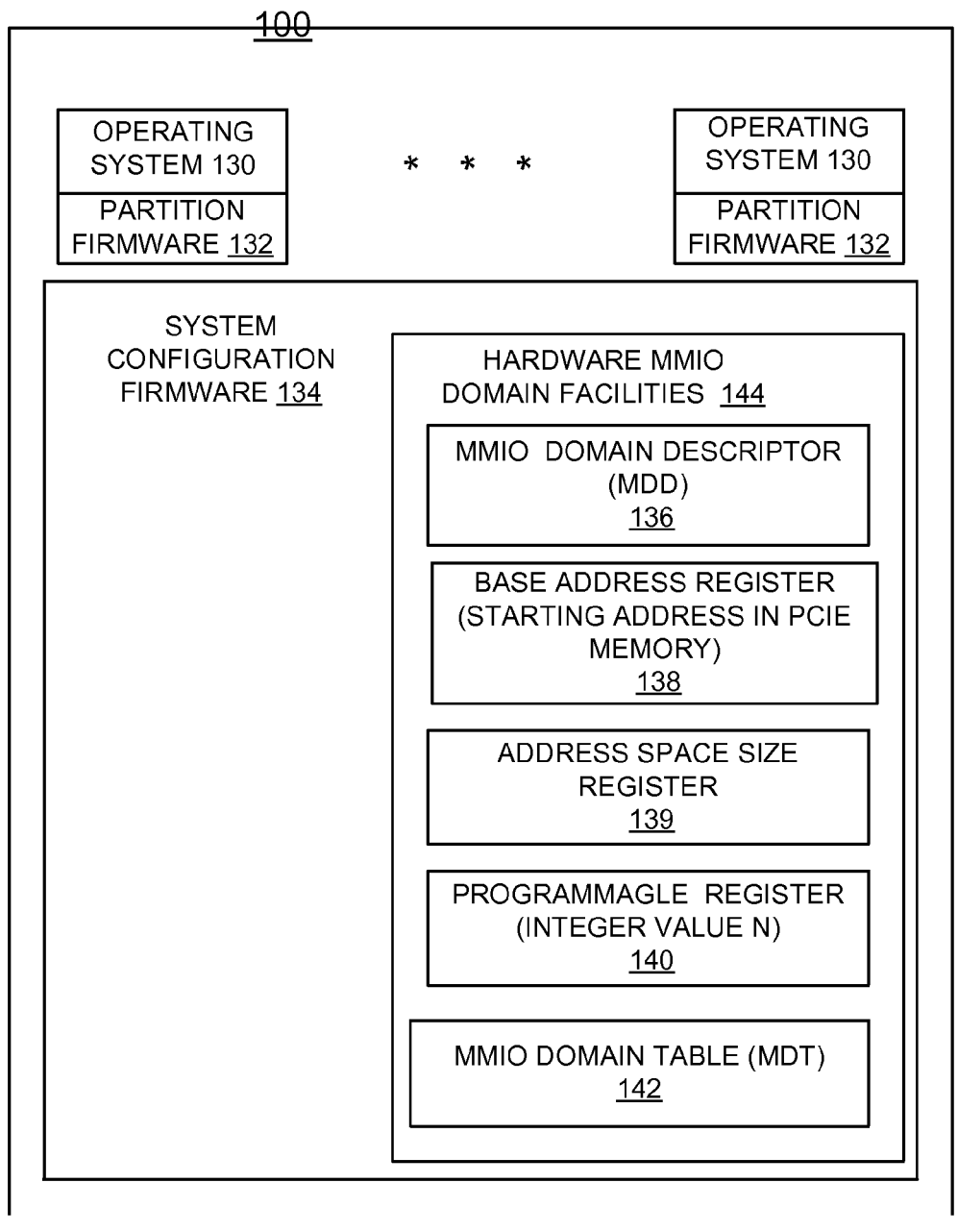

As shown in FIG. 2, computer system 100 includes a plurality of operating systems 1-N, 130 together with respective partition firmware 132, a system configuration firmware 134, a MMIO domain descriptor (MDD) 136 composed a base address register (BAR) 138, an address space size register 139, and an optional programmable register 140; and a MMIO domain table (MDT) 142. The MMIO domain descriptor (MDD) 136 including the base address register (BAR) 138, the space size register 139, and the optional programmable register 140, and the MMIO domain table (MDT) 142 are implemented in hardware MMIO domain facilities 144 to provide required hardware processing speeds. The MDD BAR 138 establishes a starting address in PCI memory for a memory region that spans a range of PCIE address space determined by the size register 139. This memory region is further divided into a number of equal size MMIO domains, nominally a predetermined number corresponding to an integer multiple from 1 to 6 of the number of VFs that the PHB intends to configure. Alternatively, the number of MMIO domains within the MDD address space is determined by the integer value of the programmable register 140. Each MMIO domain of the MDD address space corresponds to an entry in the MDT. That is, the nth MMIO domain within the address range of the MDD corresponds to the nth entry in the MDT. The entries in the MDT contain the identity of a PCI device, such as that of an SRIOV VF, to establish a protection domain associating a PCI MMIO address with the PCI device that is uniquely assigned addresses within the corresponding MDD MMIO domain.

Computer system 100 is shown in simplified form sufficient for an understanding of the invention. Computer system 100 can be implemented with various computers, for example, with one of the computer servers manufactured by International Business Machines Corporation. The illustrated computer system 100 is not intended to imply architectural or functional limitations. The present invention can be used with various hardware implementations and systems and various other internal hardware devices.

The computer system 100 includes virtual IO device solutions based on the PCI-Express (PCIE) IO bus and adapter industry standard. The PCI Single Root IO Virtualization (SRIOV) extensions to the PCIE base specification specify mechanisms to enable a PCIE device to virtualize functions within it for exclusive use by an individual device driver within an Operating System Logical Partition (LPAR), also known as a Guest Virtual Machine on Intel-based servers. As servers have increasingly consolidated many physical servers using virtual servers on fewer physical servers, PCI IO Adapter (IOA) vendors have embraced IOV as the base for example, for Fibre Channel or SAS, Ethernet, Infiniband, and Converged Network (Ethernet and FCoE) adapter offerings.

The above identified U.S. Pat. No. 7,681,083 discloses practical server applications of MMIO domains to isolate MMIO errors to individual SRIOV VFs and an apparatus suitable for hardware implementation within the PCI Host Bridge (PHB) of a PCIE Bus that determine the PCIE bus memory location and size of MMIO domains, an MMIO Domain Descriptor (MDD).

The disclosed method, apparatus and system for isolating input/output adapter error domains in a data processing system of the above identified U.S. Pat. No. 7,681,083 advantageously is used with implementing the present invention. The subject matter and disclosure of the above identified U.S. Pat. No. 7,681,083 is incorporated herein by reference.

PCIE virtual devices are described in the PCI IOV specifications as Virtual Functions (VFs) within the domain of a PCIE Physical Function (PF) within a PCIE IO adapter. Typically, to effect IO transactions, a PCI device driver in an OS LPAR operates on internal facilities of a PCI function mapped to PCI bus memory (MMIO) spaces. SRIOV VFs similarly utilize PCIE MMIO address spaces to enable device drivers to directly access facilities internal to the VF. This capability is particularly important to eliminate performance overhead of a virtualization intermediary (VI) between the OS DD and the VF.

Logical partitioning fundamentally requires isolation of virtual devices between operating systems (OS) sharing the server 100 and an SRIOV or Multi-Root IOV (MRIOV) adapter. This further requires that the OS DD, or any other OS function in one logical partition managing any one VF of an adapter be able to access the memory space of other VFs in that or other adapters on that server. Typically, hardware page tables that translate the OS virtual memory space to PCIE physical memory are controlled by a hypervisor or other server VI such that no OS can create a translation from its processor virtual memory space that enables access to PCIE memory associated with VFs that are not owned by that same OS.

VFs share a common root port in a PCIE hierarchy (the collection of PCIE bus segments and IOV PFs and VFs that are reachable through that root port). A root port, or PCI Host Bridge (PHB), tracks the operational state of the PCIE bus that is the root of that PCI hierarchy. Consequently errors associated with PCIE memory read or write, memory mapped IO (MMIO) transactions from the OS to one VF space can result in error states at that root port or PHB that effectively expand the scope of that error to affect all VFs (or other PCIE functions) sharing that root or segments of the PCI hierarchy below it.

A particular Partitionable Endpoint (PE) is correlated with a particular region of PCIE memory address space, such as an MMIO domain 136 for purposes of tracking MMIO transaction errors, and to thereby limit the effects of an MMIO error to only that PE for which the particular MMIO address in error is associated. A PE is a generalized concept of a PCIE device or function that is independently assignable to and controlled by independent LPARs, and so is directly applicable to the individual VFs of an SRIOV adapter.

MMIO domain tables (MDTs) 142 are used to associate MMIO domains within PCIE bus memory with the MMIO spaces of particular PEs. Each contiguous PCIE MMIO space of a PE must be contained within a unique MMIO domain of the PCIE MMIO address space described by an MDD 136, so that the number of MDT entries and corresponding size of an MDT 142, typically increases in proportion to the number of function PEs that PHB 112 is designed to configure. The number of MDT entries typically is further increased if the MMIO spaces of any given PE cannot be mapped into contiguous PCIE memory containable within a single MMIO domain, such that any one PE may require more than one MMIO domain.

PCI functions utilize Base Address Registers (BARs) within the configuration register space of a function, or an SRIOV Capability of a function, to map internal facilities of that function into PCIE memory for MMIO access by a device driver. Each of these PCI function BARs specifies a starting location and byte-length in the PCIE memory address space below a PHB. A PCI function may implement, for example, sup to six 32-bit BARs, which decode a 32-bit address on the PCIE bus to select the MMIO facilities within that function. Alternatively, a PCI function may combine pairs of 32-bit BARs to form 64-bit BARs capable of decoding an address anywhere within the entire address space of a PCIE bus. This correspondingly reduces the total number of BAR spaces for that function by the number of 32-bit BARs paired to form a 64-bit BAR. A function that uses all 64-bit BARs can thereby define only 3 unique BAR spaces.

For conventional PCIE functions, it is straightforward to combine the individual PCIE bus memory spaces of the function BARs within a single contiguous range of PCIE memory. By choosing an MMIO domain size sufficiently large as to span the combined BAR spaces of any one PE, the number of MDT entries required in the PHB is directly in proportion to the number of PEs it can maximally configure.

SRIOV VF BARs, however, function differently from conventional, non-IOV PCIE function BARs. Instead, the SRIOV specification defines BAR spaces for each VF as computed from a common BAR space start and size in the SRIOV facilities (SRIOV Capability) of the PF. This has the consequence that the $BAR_n$ space of each VF, where n denotes a particular BAR, from $BAR_0$ to $BAR_5$, is contiguous to that same $BAR_n$ space of the preceding and succeeding VF number. Thus, the $BAR_n$ and $BAR_{n+1}$ space of any VF must be in different PHB MMIO domains because the $BAR_n$ spaces of all other VFs $BAR_n$ space of each VF are contiguous to the $BAR_n$ space of that VF.

Further, according to the SRIOV specification mechanisms to define VF BAR space size and alignment, the byte-length and alignment of an MMIO domain mapping each unique VF $BAR_n$ must match that $BAR_n$ size and alignment. Consequently, a PHB 112 that configures SRIOV VF PEs typically may require an MDT 142 with as many as 6 MMIO domains per VF, and possibly of up to 6 different size MMIO domains, for each unique VF type sharing that PHB. In practical server applications, it is reasonable to expect at least 2 or 3 different VF types, for example, Ethernet vs fiber channel, leading to possibly as many as 18 MDT entries per VF PE. Further, practical server applications of SRIOV must provide for on the order of 128 to 512 VFs, leading to very large MDTs 142 potentially having as many as 9000 entries.

To enable rapid correlation of an MMIO domain to a Partitionable Endpoint (PE) and not unduly increase the time for that PHB hardware to process and issue the MMIO on the PCIE bus, the MDT 142 is necessarily a hardware facility of a PHB 112. Therefore, practical implementations of an MDT 142 of the preferred embodiments must be limited to the minimum possible number of entries.

In accordance with features of the preferred embodiments, recognizing the significant value to practical server applications of MMIO domains 136 to isolate MMIO errors to individual SRIOV VFs, the present invention teaches methods of MMIO domain 136 translation that yield efficient and practical implementations of the PHB 112 while not sacrificing flexibility to accommodate large variations in the number and type of SRIOV VFs configured under such PHBs.

In accordance with feature of the invention, a first method of implementing MMIO Domains, for example as disclosed in U.S. Pat. No. 7,681,083, utilizes an MMIO domain descriptor (MDD) 136 to associate MMIO domains with VF BAR spaces according to the PCIE SRIOV specification of VF BARs.

According to the first method one MDD 136 is required for each unique VF BAR space size per bus segment that connects an SRIOV device below a PHB 112. This enables an efficient hardware implementation of a nominally small number of MMDs 136 per SRIOV bus segment sufficient to associate with a nominally small number of anticipated differing VF BAR space sizes on that segment. According to Method 1, the size of the MDT is then limited to only the number of SRIOV VFs, rather than that number times the number of varying VF BAR sizes and again times the number of PCI bus segments configuring SRIOV VFs.

In accordance with feature of the invention, a second method of the present invention improves on the first method, utilizing a VF BAR Stride mechanism that modifies the location of individual VF BAR spaces to fixed size address alignments, applicable to all BAR spaces of all VFs sharing a single PCI bus segment. This fixes the number of number of MDDs per PCI bus segment to one MDD per SRIOV VF BAR, rather than one per unique SRIOV VF BAR size.

In accordance with feature of the invention, the second method in contrast fixes the number of MDDs at one for each SRIOV VF BAR and so is capped at the upper bound of the number of BARs VF types implement, rather than the variety of sizes. As most SRIOV VFs implement 3 or fewer BARs, method 2 yields a PHB implementation of potentially only 3 MDDs per PCI bus segment configuring SRIOV VFs. The second method preserves the advantage that the PHB implement an MDT having at most one entry per SRIOV VF for the totality of VFs the PHB must be capable to configure in practical server applications.

In accordance with feature of the invention, a third method of the present invention teaches an alternative MDD apparatus that combined with the VF BAR Stride of the second method, each VF may associate with up to 6 independent MMIO domains within the region of PCIE memory spanned by the MDD. Utilizing this MDD apparatus in combination with the second method improves in further reducing the number of MDDs in the PHB hardware implementation to just one MDD per SRIOV bus segment.

Referring to FIGS. 3, 4, 5, 6, 7, and 8, there are shown exemplary mechanisms and methods for implementing PCI-Express memory domains for single root virtualized devices in accordance with the preferred embodiments. In FIGS. 3, 4, 5, and 6, the same reference numbers are used for similar or identical components.

Figure 3:
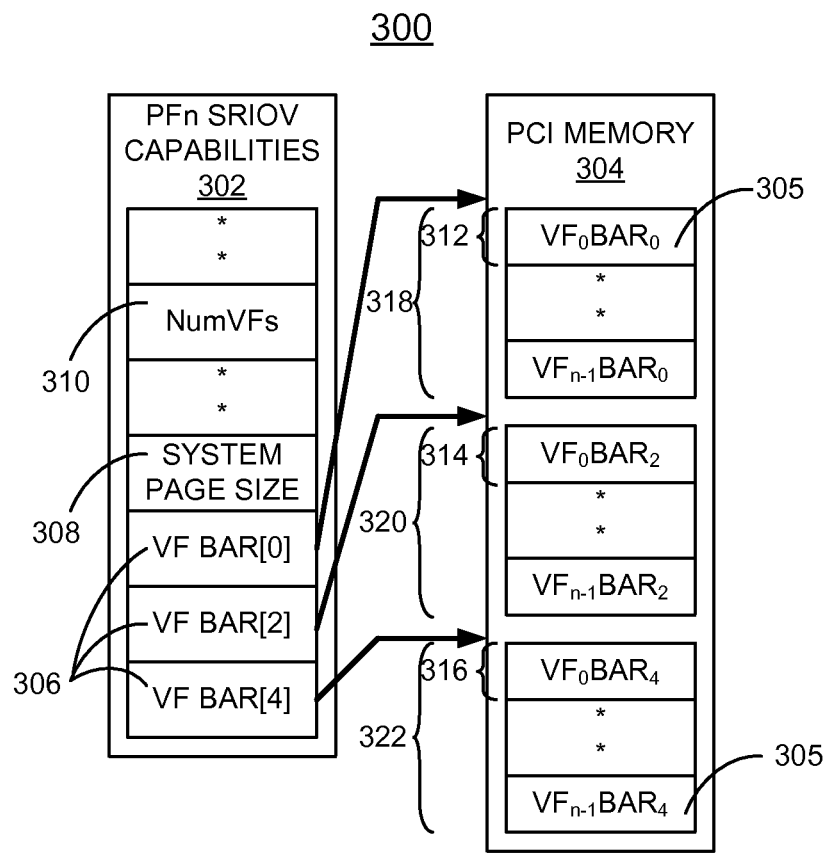
FIGS. 3, 4, 5, 6, 7, and 8 are diagrams illustrating exemplary mechanisms and methods for implementing PCI-Express memory domains for single root virtualized devices in accordance with the preferred embodiments.

Referring to FIG. 3, there are shown exemplary mechanism generally designated by the reference character 300 for implementing PCI-Express memory domains for single root virtualized devices. The PCI Single Root IO Virtualization and Sharing mechanisms 300 illustrate example PFn SRIOV Capabilities 302 for defining PCI memory 304. The PFn SRIOV Capabilities 302 define a plurality of VF memory spaces 305 of PCI memory 304 via a plurality of PF VF BARn registers 306. The PFn SRIOV Capabilities 302 include a System Page Size (SPS) register 308 to define the host page size that maps data structures within all VF BARn spaces. The illustrated PFn SRIOV Capabilities 302 include a number of VFs (NumVSs) 310. For example, the BARn spaces 305 for a set of VFs ($VF_0$-$VF_{n-1}$) under that PF are then a power of 2 multiple of that SPS value of register 308, generally the nearest power of 2 value equal to or greater than the number of SPS pages required to map the data structures in that BARn space. The PCI memory 304 includes a respective VF $BAR_0$ Size 312, a VF $BAR_2$ Size 314, and a VF $BAR_4$ Size 316; and a respective NumVFs x $BAR_0$ Size 318, a NumVFs x $BAR_2$ Size 320, and a NumVFs x $BAR_4$ Size 322.

As shown, the PCI Memory spaces 305 for a given BARn of each VF, in which n indicates $BAR_0$ through $BAR_5$ are contiguous to the BARn of the predecessor and successor VF of a given PF, at boundaries that are power of 2 multiples of a PF SRIOV Capability SPS. For example, If a VF BARn maps four 4K pages, for a total of 16 KB of PCI memory per VF, and the PF SRIOV Capability System Page size is set to 4K, then each VF's BARn space is placed at an offset from the base PF VF BARn register that is that VF number times 16K.

In the first method of the invention for implementing PCI-Express memory domains for single root virtualized devices, the PCI host bridge (PHB) 112 includes a memory mapped IO (MMIO) domain descriptor (MDD) 136 used to associate MMIO domains with PCI memory VF BAR spaces 305. One MDD 136 is provided for each unique VF BAR space size 312, 314, 316 per bus segment connecting a single root IO virtualization (SRIOV) device to the PCI host bridge (PHB) 112. A base address register 306 in the SRIOV Capabilities of the SRIOV PCI adapter defines the starting address in PCIE memory 304 of a set of contiguous VF MMIO spaces 305. The alignment of the base address register 306 specifies, for example, as a power of 2 value, the size of the region of PCIE memory required by any one VF for that particular BAR space (0, 1, and so on up to BARE according to the number and size of BARs the VFs implement). The NumVFs register 310 of the SRIOV Capabilities times the size of a VF BAR[n] determines the totality of contiguous PCI memory required for the totality of VFs for their collective BAR[n] spaces. The MDD 136 further includes a programmable register 138 containing an integer value, n, that divides the totality of the PCIE memory address space determined by the MDD Base Address Register into n MMIO domains of size 1/nth of said MDD region size. The value of n is determined such that the size of the MMIO domains of the MDD are equal to that required of a particular VF BAR[n] space. An MDT 142 used with the MDD 136 having a size including a number of entries limited to a multiple of a predefined total number of SRIOV VFs to be configured, and such that the BAR[n] space of each VF, for each BAR[n], has an entry in the MDT.

In accordance with the invention, the PHB 112 provides a multiplicity, or pool, of MDD hardware elements. The PHB 112 provides a number of MDD hardware elements corresponding minimally to the total number of PCI bus segments for which it is capable of configuring SRIOV VFs multiplied by the number of unique SRIOV VF BAR sizes anticipated to be possible within a practical server implementation. Nominally, each MDD 136 must provide one MMIO domain 305 per VF BAR size 312, 314, 316, times the number of VFs 310 utilizing that BAR space size. For example, if the MDD provides only a single MMIO domain per VF, then one MDD of that particular BAR size must be provided for each VF BARn utilizing that size, up to a total of 6 for SRIOV adapters that provide the maximum 6 BARs in 32-bit PCI memory space.

The MDD 136 is a hardware element of a PHB 112 suitable for programming by system configuration firmware 134. An alternative implementation of MDD MMIO domains is to provide a predetermined number of MMIO domains within an MDD according to a fixed value, such as the total number of SRIOV VFs, or that number of VFs times 3 or 6, to account for multiple BARs per VF, instead of using the integer value, n from programmable register 138.

Figure 4:
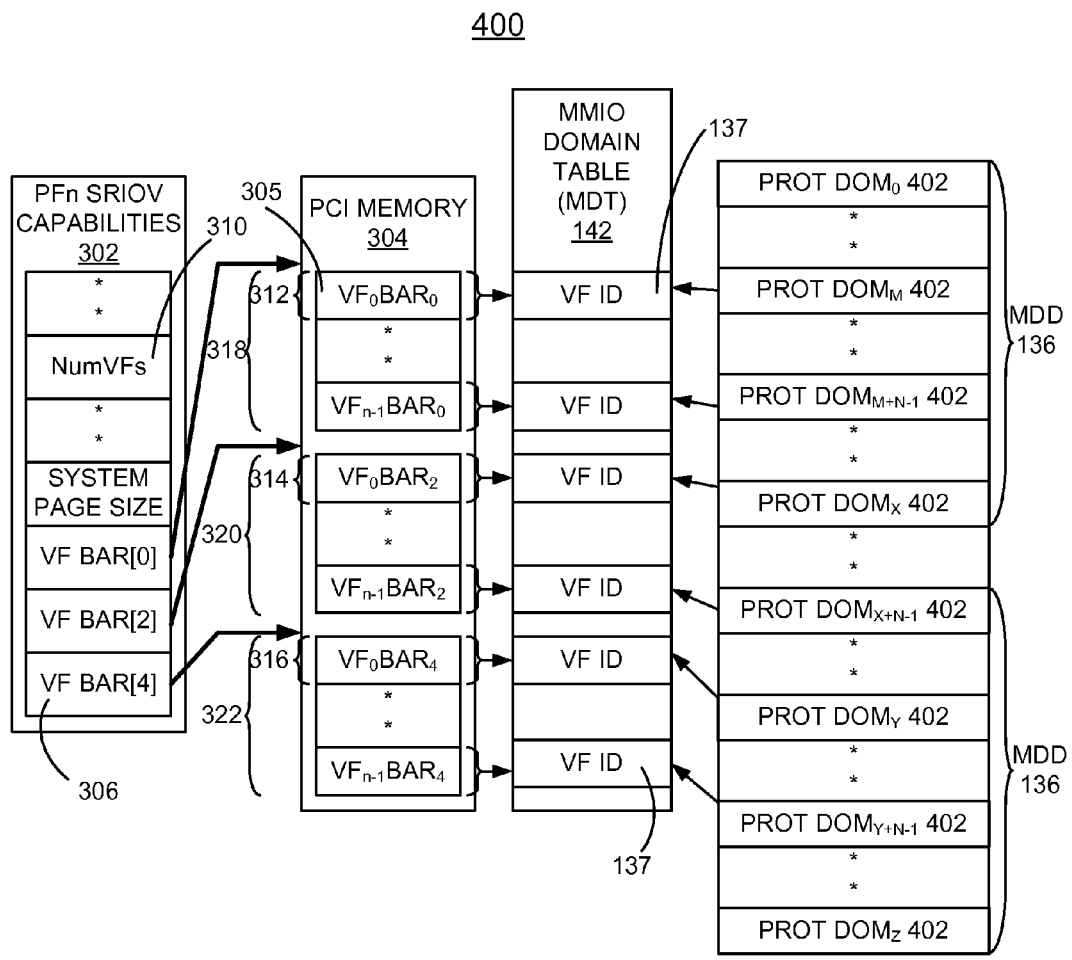

Referring to FIG. 4, there are shown exemplary mechanism generally designated by the reference character 400 for implementing PCI-Express memory domains for single root virtualized devices with a respective associated protection domain 402 over the PCI memory address spaces 305 of a VF. The protection domains 402 are established by correlation of the PCI memory address spaces 305 of a VF through the MDT 142 containing the identity 137 of the VF assigned that corresponding MDD 136.

Within the root port architecture, a protection domain can span all BAR spaces of a given VF. However, because SRIOV VF BAR placement results in BAR spaces of other VFs being contiguous to BARn space of a VF, the individual BARn spaces of any one VF cannot be mapped within a single PCI memory region that does not also contain BARn spaces of other VFs. Thus, a root port using protection domains cannot map only BAR spaces for a single VF within that domain and requires that the root port provide a protection domain, such as protection domain 402 for each BARn of every VF, as shown.

Because the size and alignment of the VF BARn space of any given PF can vary by PF device type, which in turn could require root port protection domains that are the size of each unique VF BAR size, for all PF types below that root. It is preferred in the root port implementation to provide the minimum possible set of protection domain descriptors 402, using a common domain size, and simply associate VF BARn spaces with individual domains of that common size. This then requires that VF BARs be aligned on a boundary that matches the root port domain size, such that only one VF BAR space is contained within that domain, and that the domain size in the root port be as large as the largest VF BAR size required under any one PF sharing that root port. VF BARs that are smaller than that domain size are aligned on a domain boundary and PCI memory space beyond that VF BAR size is simply unused or unreachable address space.

SRIOV provides for VF BAR alignment only on a power of 2 multiple of the SPS value. Because SPS must map data structures to system page sizes, this is not generally a means to create such an alignment for all VF BARs. For example, if a root port used a protection domain size of 1 MB, to force all VF BARs to map uniquely to one, or a contiguous set of such 1 MB domains could be accomplished by setting all the SPS value of all SRIOV PFs sharing that port to 1 MB. However, if the system uses a memory page size of 4 KB, the SPS must be set to 4 KB, to provide the intended function of the SPS register.

Figure 5:
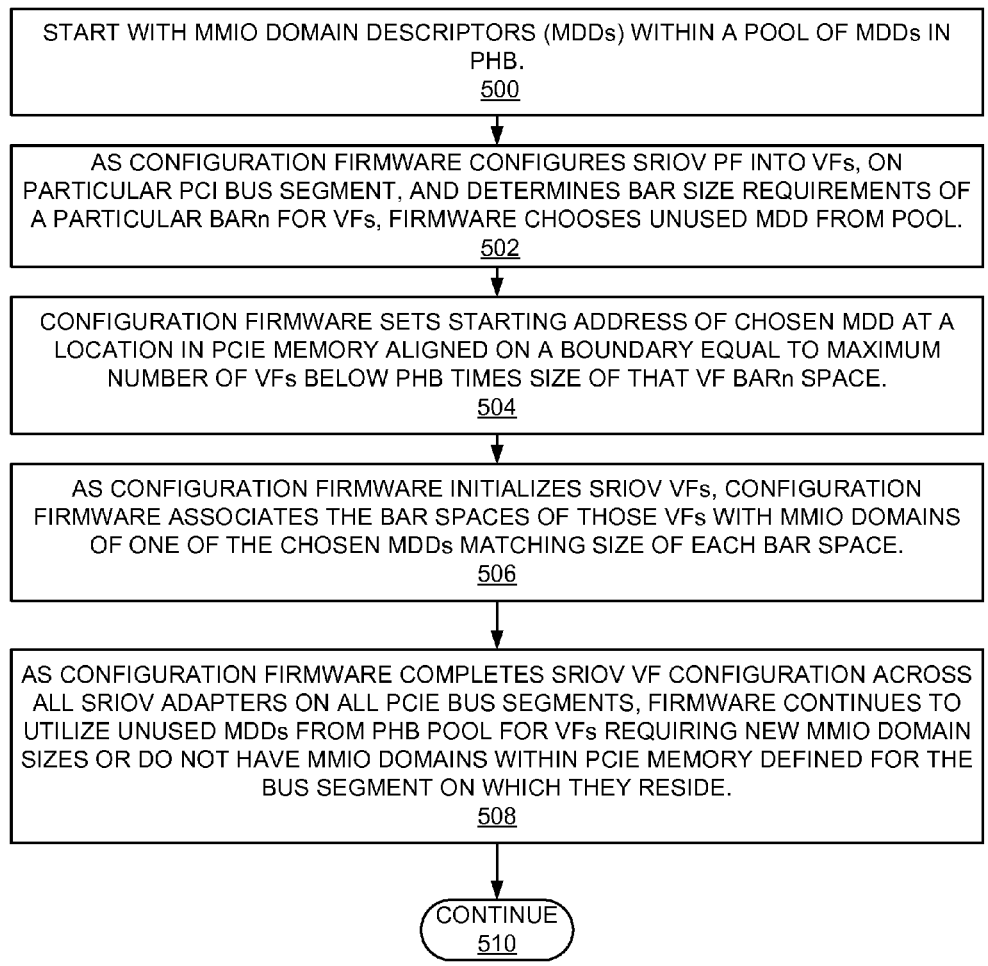

Referring to FIG. 5, the first method of the invention starts as indicated at a block 500 with a multiplicity or pool of MDD hardware elements in the PHB, which provides a number of MDD hardware elements corresponding minimally to the total number of PCI bus segments for which it is capable of configuring SRIOV VFs multiplied by the number of unique SRIOV VF BAR sizes anticipated to be possible within a practical server implementation.

For example, in practical server implementations of SRIOV, adapter utilize 3 64-bit BARs, of which the first 1 or two BAR spaces are 4 KB or 8 KB, and the third BAR space is some larger size. A minimum PHB implementation must provide nominally then 3 MDDs per SRIOV PCI bus segment: 1 MDD for BAR 0, 1 MDD for BAR 2, and 1 MDD for BAR 3. However, some classes of SRIOV adapters utilize differing VF (or PF) types within the same adapter, which in turn can require differing VF BAR sizes for each VF type. For example, Converged Network Adapters provide VF types for basic Ethernet, Fiber Channel over Ethernet, and advanced Ethernet protocols such as iWARP, iSCSI, TOE, and others. Each of these VF types likely requires at least one, and possibly two, BAR spaces of size common to all VF types, but can require at least one, and possibly two, BAR space sizes different from the other VF types. Therefore, practical PHB implementations suitable to varying server SRIOV adapter types and configurations must provide for more than just 3 VF BAR sizes.

In practice, assuming best case that differing VF types utilize the same BAR space size for 2 BARs, and differ in only one BAR type, and the PHB must be capable of configuring at least 3 VF types, such as including Ethernet, FCoE, and one advanced protocol, the PHB must in practice provide at least 5 VF BAR sizes, or 5 MDDs per SRIOV bus segment: 2 MDDs for the commonly sized first 2 BARs of each VF and then 3 MDDs one for each of the 3 VF types unique 3rd BAR space. As practical server implementations utilize 4 or fewer PCI bus segments connecting SRIOV adapters below a single PHB, practical PHB implementations of the first method utilizing a pool of 20 MDDs provides sufficient flexibility to accommodate a variety of SRIOV adapter types and configurations.

According to the first method, at block 500 the MMIO domain descriptors are within a pool of MDDs in the PHB. The PHB makes no predetermined association of any one MMIO descriptor within that pool to a particular VF or SRIOV PCI bus segment.

As indicated at a block 502, as configuration firmware configures an SRIOV PF into VFs, on a particular PCI bus segment, and determines the BAR size requirements of a particular $BAR_n$ for those VFs, firmware chooses an MDD from within those yet unused in that pool.

Configuration firmware then sets the starting address of that MDD to be at a location in PCIE memory that is aligned on a boundary equal to the maximum number of VFs below the PHB times the size of that VF $BAR_n$ space as indicated at a block 504. As configuration firmware initializes SRIOV VFs, configuration firmware associates the BAR spaces of those VFs with the MMIO domains of one of the chosen MDDs matching the size of each BAR space as indicated at a block 506.

As configuration firmware completes SRIOV VF configuration across all SRIOV adapters on all PCIE bus segments, firmware continues to utilize unused MDDs from the PHB pool for VFs that require new MMIO domain sizes or do not have MMIO domains within the PCIE memory defined for the bus segment on which they reside as indicated at a block 508. Operation continue as indicated at a block 510.

Alternatively, it should be understood that the first method can include that if varying sizes of VF BARs are known a priori, then configuration firmware allocates from the PHB pool an MDD for each of these known BAR sizes, prior to detecting individual VF BAR sizes, on each SRIOV PCI bus segment. For example, a practical server implementation may anticipate a particular variety of SRIOV adapters, such that the VF BAR space requirements of these adapters are known as a fixed parameter of the server design. Such a server might, for example, anticipate SRIOV adapters that require 4K, 64K, and 1 MB BAR sizes, and these being the only such sizes utilized by the anticipated SRIOV adapters in that server. Configuration firmware may then allocate one or more MDDs for each exemplary BAR size, as necessary to provide one unique MMIO domain per VF BAR space of that size.

As taught in U.S. Pat. No. 7,681,083 each MDD MMIO domain correlates to a particular VF PE entered in an MDT. The PHB 112 could provide an MDT in association with each MDD. However, this increases the hardware resources within the PHB substantially, such that it is an objective of the present invention that the PHB provides only one instance of an MDT, and all MDDs associate their MMIO domains with the PEs entered in that table. For example, an MDD0, MDD1, and so on through MDD15, each having n domains, associates domain 0 with the 0th entry of the MDT, and in turn with the same VF PE entered in that entry of the MDT. Similarly, domain m of all MDDs associates with the mth entry of the MDT, and in turn the VF PE in that mth entry. This requires that the MDDs span regions of PCI memory larger than actually used, as some VF PEs may not be created or their VF BARs may be of a different size than the MMIO domains of a particular MDD. However, the server includes virtualization management firmware, for example, a hypervisor that manages mapping tables to translate OS virtual memory addresses to PCIE memory addresses associated with VF BARs. For VFs that do not utilize MMIO domains of a particular MDD, the virtualization management firmware does not permit an OS to map PCIE memory domains not actually associated with BARs of VFs owned by that OS, such that these unused MMIO domains within an MDD are never actually accessible as PCIE MMIO transaction targets.

Alternatively, the PHB 112 may implement an implicit association of the MDD domains with an ordinal number correlating to a VF, such as a "PE Number", such that a VF address space selects an MDD domain that implies the PE number of that VF, then an MDT is not required to perform the correlation of PCI address to a VF ID assigned to that PCI memory space.

Figure 6:
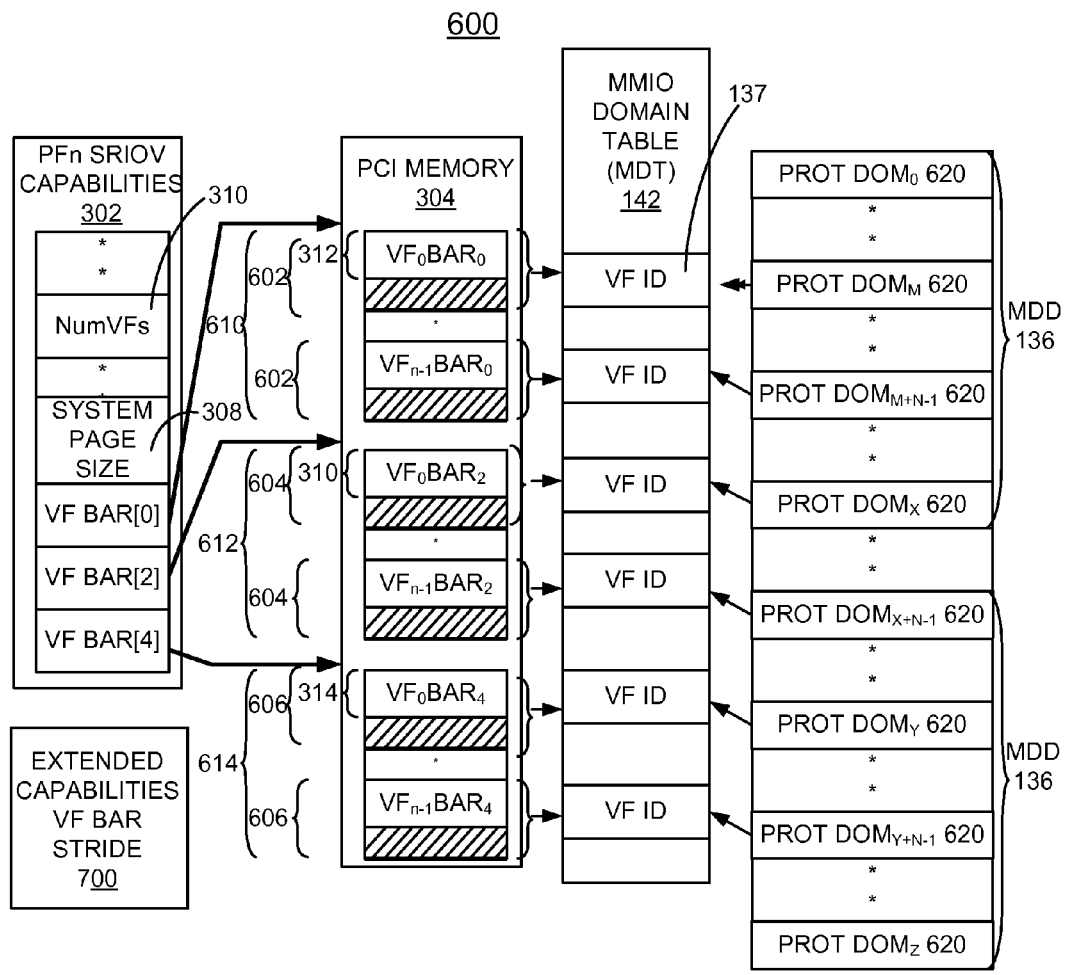
Figure 7:
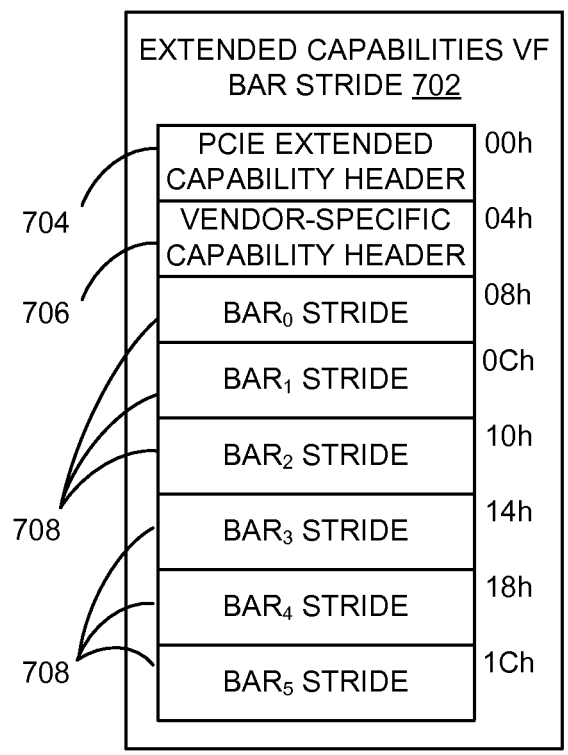

Referring to FIG. 6 and FIG. 7, there is shown an exemplary mechanism generally designated by the reference character 600 for implementing PCI-Express memory domains for single root virtualized devices with an extended capability VF BARn stride 700 allowing a host system to specify a VF BARn stride. The extended capability VF BARn stride 700 is illustrated in FIG. 7.

An additional means is provided to specify a VF BAR Stride value that would align VF BAR spaces on a boundary consistent with a root port protection domain size. This would allow the host system to align each VF BARn on a common protection domain boundary regardless of whether the actual space requirements of the data structures within that BARn are less than that domain size, or BAR stride. By means of the Vendor-Specific Extended Capabilities it is possible to define such a BAR Stride mechanism that modifies SRIOV VF BARn placement in PCI memory space in a manner that enables protection domain of a single size across all VF BAR spaces below one root port.

The VF BARn stride 700 includes an Extended Capabilities VF bar stride 702 including a PCIE extended capability header 704, a Vendor specific capability header 706 in the SRIOV PF Configuration Space, and a plurality of BARn strides 708, $BAR_0$-$BAR_5$, as illustrated in FIG. 7.

The PCI memory 304 includes a respective VF $BAR_0$ Size 312, a VF $BAR_2$ Size 314, and a VF $BAR_4$ Size 316; a respective set of $BAR_0$ Size x $BAR_0$ Stride 602, $BAR_2$ Size x $BAR_2$ Stride 604, and $BAR_4$ Size x $BAR_4$ Stride 606; and a respective NumVFs x $BAR_0$ Size x $BAR_0$ Stride 610, a NumVFs x $BAR_2$ Size x $BAR_2$ Stride 612, and a NumVFs x $BAR_4$ Size x $BAR_0$ Stride 614.

In accordance with features of the invention, the second enhanced method utilizes the VF BAR Stride Capability to reduce the number of MDDs required to map SRIOV VF BAR spaces. The VF BAR Stride Capability that enables configuration firmware to modify the PF VF $BAR_n$ alignment and offset relative to each other, such that the $BAR_n$ space of every VF, for every $BAR_n$ of every VF is aligned on a particular PCIE memory boundary that can be associated with a single MMIO Domain size.

Referring to FIG. 7, the vendor must define a Vendor-Specific Header 706 at offset 0x04, which may conform to the format that vendor provides for any other Vendor Specific Extended Capabilities it supports. The Vendor-Specific Header 706 used with this capability must uniquely identify this Vendor-Specific Extended Capability as a VF BAR Stride Capability. The VF BAR Stride Capability provides six 32-bit registers, 0-5, in bytes [08 h: 31 h] of the Vendor-Specific Extended Capability that must conform to the following definition:

Bits [30:0] VF BARn Stride.

These bits define the alignment and stride of the corresponding VF BARn address spaces in PCI memory. Bits [30:0] are a power of 2 value that multiplies the PF VF BARn value to compute the starting address and alignment of the BARn for each VF. That is, the starting address of BARn for each VF is computed as the PF VF BARn base address times the value of bits [30:0], times the VF number. The resulting BARn for each VF is then aligned on that resulting power of 2 value (as the VF BARn base is always a power of 2 multiple of the System Page Size, the result of multiplying that base times the VF Stride value is a power of 2).

Bits [30:0] are only defined for power of 2 values—1, 2, 4, 8, etc, up to 2**30—and may have only 1 bit set and all other bits must be '0'. The result of setting multiple of bits [30:0] to '1' when bit [31] is also '1' is undefined. Bit [30:0] are ignored when bit [31] is '0'. For 64-bit VF BARn registers, only registers 0, 2, and 4 are defined and registers 1, 3, and 5 are treated as "disabled" with bit [31] implicitly set to '0'.

The result of adding a VF BARn Stride to the PF SRIOV VF BARn base, for each VF, is to create a VF BARn space for each VF that is at least as large, or a power of 2 size larger than, the minimum VF BARn space required by that PF SRIOV Capability, and aligned for each VF on this VF BARn Stride value. The VF need not respond (may discard writes and respond to lreads with UR and all ones data, or just all ones data) to accesses within the VF BARn Stride space that exceeds the actual VF BARn required space.

Bits [31] VF BARn Stride Enable.

When '1', the VF BARn Stride for this PF SRIOV VF BARn space is applied. When '0', the computation of VFn BARn offset from the PF SRIOV VF BARn is unchanged from the PF SRIOV Capability VF BARn values. The default value of this bit is '0'.

Host SRIOV configuration firmware utilizes this capability, when present, to establish a VF BARn stride that matches host root port requirements to align VF BARn spaces, for any VF BARn spaces that are less than that alignment. This assures that BARn for each VF aligns in PCI memory on that desired root port alignment. The use of this capability does not alter the basic definition of the SRIOV Capability VF BARn registers, except for the computation of offset from that VF BARn register address to each VFn BARn space. It would be apparent to one skilled in the art that there are alternative mechanisms to enable host configuration firmware to set a VF BAR stride within the adapter, prior to processing and configuring the SRIOV capabilities of the adapter., such as vendor-specific configuration or PF BAR space registers, boot time adapter ROM values, and so forth.

Figure 8:
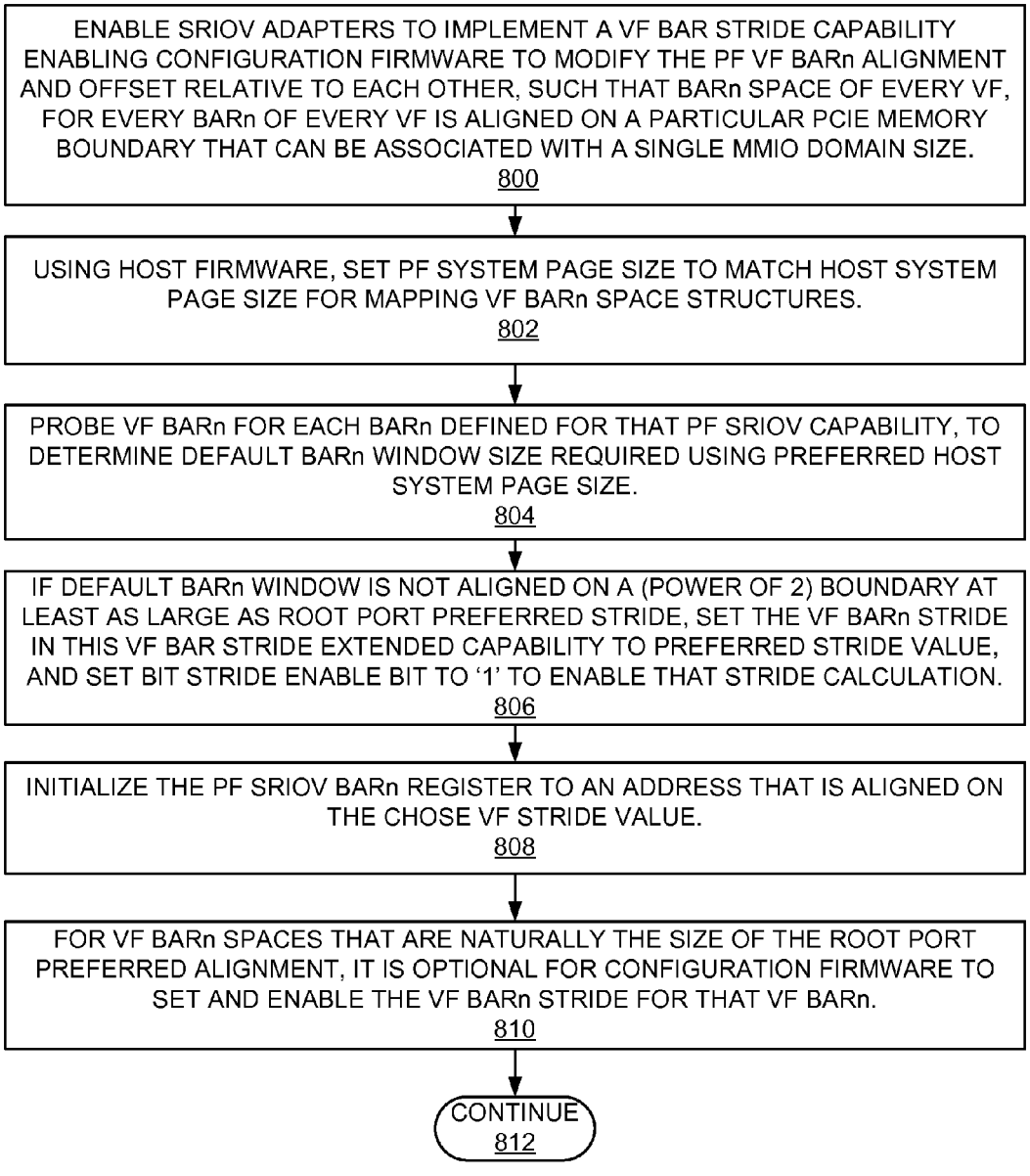

Referring to FIG. 8, there are shown example steps performed by host firmware to enable SRIOV adapters to implement the VF BARn Stride capability to reduce the number of MDDs required to map SRIOV VF BAR spaces utilizing the second method of the invention as indicated at a block 800.

The second method of the present invention improves upon the first method utilizing the VF BAR Stride Capability to reduce the number of MDDs required to map SRIOV VF BAR spaces. According to the second method, SRIOV adapters implement a VF BAR Stride Capability that enables configuration firmware to modify the PF VF $BAR_n$ alignment and offset relative to each other, such that the $BAR_n$ space of every VF, for every $BAR_n$ of every VF is aligned on a particular PCIE memory boundary that can be associated with a single MMIO Domain size. Utilizing the second method, all VF BAR spaces may be aligned to a common MMIO domain boundary and size that is sufficiently large to map the largest of the VF BAR space sizes. This means all MDDs creating MMIO domains on a particular SRIOV PCI bus segment may be of one common size, and one MDD per VF BAR is nominally required, independent of the variety of VF BAR sizes. This reduces the number of MDDs a practical PHB must implement to just 3 per SRIOV PCI Bus Segment, or 12 total in practice.

According to the second method, configuration firmware detects the VF BAR sizes of all VFs on an SRIOV PCI bus segment to determine the largest such BAR space size. This becomes the MMIO domain size of all MDDs mapping VF BAR spaces on that SRIOV PCI bus segment. Configuration firmware chooses an MDD from the PHB pool for each VF BAR space that the VFs utilize, and initializes it to be this common MMIO domain size. As part of configuring the VFs, configuration firmware sets this MMIO domain size as the VF BAR Stride in the VF BAR Stride Capability of each SRIOV PF, for each VF BAR defined by that SRIOV PF.

Host firmware performs the following steps to enable SRIOV adapters to implement the VF BARn Stride capability.

1. Set the PF System Page Size to match the host system page size for mapping VF BARn space structures as indicated at a block 802.
2. Probe the VF BARn for each BARn defined for that PF SRIOV capability, to determine the default BARn window size required using the preferred host System Page Size as indicated at a block 804.
3. If the default BARn window is not aligned on a (power of 2) boundary at least as large as the root port preferred stride, set the VF BARn Stride in this VF BAR Stride Extended Capability to that preferred stride value, and set the bit [3] Stride Enable bit to '1', to enable that stride calculation as indicated at a block 806.
4. Initialize the PF SRIOV VF BARn register to an address that is aligned on the chosen VF stride value as indicated at a block 808.

5. For VF BARn spaces that are naturally the size of the root port preferred alignment, it is optional for configuration firmware to set and enable the VF BARn stride for that VF BARn as indicated at a block 810. Operations continue as indicated at a block 812.

A third method of the present invention utilizes a particular definition of the MDD to further improve on the second method and reduce the number of MDDs required to at most one per SRIOV bus segment below a PHB. According to the third method, the MDD includes a 3-bit value indicating a number of "BAR domains", b_num. This multiplies the MDD PCI memory region by b_num groups of MMIO regions of the MDD size register 139, and in which each group contains n MMIO domains, where n is the number of VF PEs practically anticipated below any one SRIOV PCI bus segment. The b_num MMIO regions are contiguous to each each other with the $0^{th}$ region starting the PCI address in the MDD BAR 138 and successive regions starting at corresponding multiples of the MDD region size register 139.

For a given bus segment, b_num represents the maximum number of BARs required by any one VF type on that PCI bus segment. For example, if 3 64-bit BARs are required by one VF type, and all other VF types require the same or fewer $BAR_n$ spaces, the b_num needed in the MDD for that PCI bus segment is '3'. If any one VF type implements the maximum of six 32-bit BARs, then the b_num must be set to '6', the maximum possible b_num value.

For example of 3 BARs as the maximum BARs for any VF on that SRIOV PCIE bus segment, and up to 256 VF PEs below a PHB, an MDD set to a b_num of 3 provides 3 MMIO regions, each having 256 MMIO domains. The first region creates 256 MMIO domains utilized to map the first BAR of the VFs, the second region creates 256 MMIO domains utilized to map the second BAR of the VFs, and the third region creates 256 MMIO domains utilized to map the first BAR of the VFs. The PHB utilizes the region and domain index associated with each MMIO domain to index the MDT.

In an alternative embodiment, a PHB MDD has a predetermined fixed b_num, anticipating the maximum number of BAR spaces per VF in a practical server implementation. The b-num is then not programmable for each MDD and saves 3 bits per MDD in the PHB hardware. A pre-determined b_num of '6' assures that the PHB is capable of the maximum architected number of BARs for any one VF, at the expense of larger MMIO regions per SRIOV PCIE bus segment.

Utilizing the MDD of the third method in conjunction with the VF BAR Stride of the second method results in a practical PHB 112 implementation that requires at most one MDD per SRIOV PCI bus segment, nominally 4 for a PHB that expands through a PCIE switch to 4 SRIOV PCI bus segments.

Figure 9:
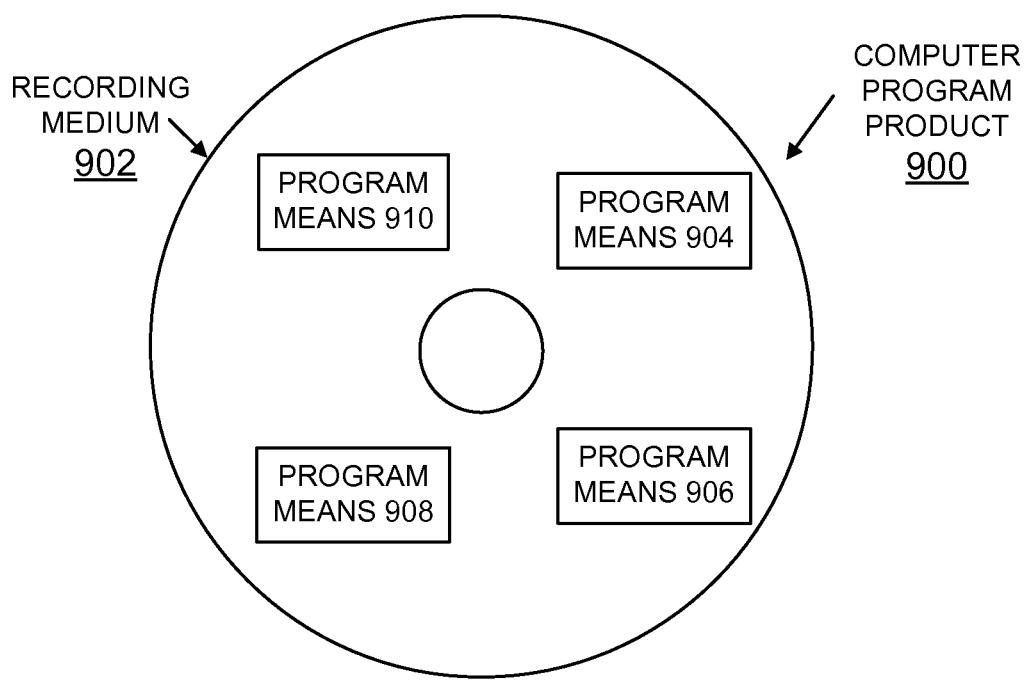
FIG. 9 is a block diagram illustrating a computer program product in accordance with the preferred embodiment.

Referring now to FIG. 9, an article of manufacture or a computer program product 900 of the invention is illustrated. The computer program product 900 includes a recording medium 902, such as, a floppy disk, a high capacity read only memory in the form of an optically read compact disk or CD-ROM, a tape, or another similar computer program product. Recording medium 902 stores program means 904, 906, 908, 910 on the medium 902 for carrying out the methods for implementing PCI-Express memory domains for single root virtualized device of the preferred embodiment in the system 100 of FIGS. 1 and 2.

A sequence of program instructions or a logical assembly of one or more interrelated modules defined by the recorded program means 904, 906, 908, 910, direct the computer system 100 for implementing PCI-Express memory domains for single root virtualized device of the preferred embodiment.

While the present invention has been described with reference to the details of the embodiments of the invention shown in the drawing, these details are not intended to limit the scope of the invention as claimed in the appended claims.

What is claimed is:

1. A method for implementing PCI-Express (PCIE) memory domains for single root virtualized devices in a computer system comprising:
    using a memory mapped IO (MMIO) domain descriptor (MDD) and an MMIO Domain Table (MDT) to associate MMIO domains with PCI memory Virtual Function (VF) Base Address Register (BAR) spaces;
    providing one said MDD for each unique VF BAR space size per bus segment connecting a single root IO virtualization (SRIOV) device to a PCI host bridge (PHB);
    providing in said MDD a base address register defining the starting address in PCIE memory of a set of contiguous MMIO domains;
    providing in said MDD a size register defining the size of a region of contiguous PCI memory encompassing said MMIO domains; and
    providing in said MDD a programmable register containing an integer value, n, for dividing the totality of the PCIE memory address space determined by the Base Address Register into n MMIO domains of size 1/nth of said region size.

2. The method as recited in claim 1 includes providing said MDD within a pool of MDDs in said PHB.

3. The method as recited in claim 1 includes utilizing system configuration firmware, configuring an SRIOV Physical Function (PF) into Virtual Functions (VFs) on a PCI bus segment.

4. The method as recited in claim 3 includes limiting a size of said MDT to only the number of SRIOV VFs, said size corresponding to a number of entries comprising that MDT.

5. The method as recited in claim 3 includes said PHB providing a pool of said MDDs; and utilizing system configuration firmware, selecting an unused MDD within said pool of MDDs in said PHB.

6. The method as recited in claim 1 includes utilizing system configuration firmware, setting a starting address of said selected MDD at a location in PCIE memory aligned on a boundary equal to the maximum number of VFs below said PHB times said VF BAR space size.

7. The method as recited in claim 1 includes utilizing a VF BAR Stride within an SRIOV adapter defining a PCI memory space size common to all VF BARs to reduce the number of MDDs required to map SRIOV VF BAR spaces.

8. The method as recited in claim 7 wherein utilizing said VF BAR Stride includes utilizing configuration firmware to detect VF BAR sizes of all VFs on an SRIOV PCI bus segment and determine a largest BAR space size.

9. The method as recited in claim 7 wherein utilizing said VF BAR Stride includes utilizing configuration firmware to modify the PF VF $BAR_n$ alignment and offset relative to each other, such that the $BAR_n$ space of every VF, for every $BAR_n$ of every VF is aligned on a PCIE memory boundary.

10. The method as recited in claim 7 wherein said PCIE memory boundary is associated with a single MMIO domain size.

11. The method as recited in claim 8 wherein utilizing said VF BAR Stride includes providing a predefined value in said MDD, said predefined value indicating a number of BAR domains, said predefined value divides the MDD PCI memory region into said number of groups of MMIO domains, wherein each said group contains a predefined number of MMIO domains.

12. The method as recited in claim 1 includes utilizing a VF BAR Stride Capability structure in a SRIOV PF configuration space to specify a common VF BAR space size.

13. A computer system for implementing PCI-Express (PCIE) memory domains for single root virtualized devices comprising:
   a processor,
   a system bus;
   a PCI host bridge (PHB); said PHB connected to said system bus and providing an interface for a PCI bus and an IO fabric connected to a plurality of PCI input/output (IO) adapters;
   said PHB including a memory mapped IO (MMIO) domain descriptor (MDD) and an MMIO Domain Table (MDT) being used to associate MMIO domains with PCI memory Virtual Function (VF) Base Address Register (BAR) spaces; one said MDD being provided for each unique VF BAR space size per bus segment connecting a single root IO virtualization (SRIOV) device to said PCI host bridge (PHB);
   a base address register being provided in said MDD defining the starting address in PCIE memory of a set of contiguous MMIO domains;
   a region size register being provided in said MDD defining the size of PCI memory space encompassing said MMIO domains; and
   a programmable register being provided in said MDD containing an integer value, n, for dividing the totality of the PCIE memory address space determined by the Base Address Register into n MMIO domains of size 1/nth of said region size.

14. The computer system as recited in claim 13 wherein said computer system is a logically partitioned and said plurality of PCI IO adapters are assigned to different logical partitions.

15. The computer system as recited in claim 13 includes a pool of MDDs in said PHB; and system configuration firmware configuring an SRIOV Physical Function (PF) into Virtual Functions (VFs) on a PCI bus segment.

16. The computer system as recited in claim 15 includes said system configuration firmware, selecting an unused MDD within said pool of MDDs in said PHB.

17. The computer system as recited in claim 16 includes said system configuration firmware, setting a starting address of said selected MDD at a location in PCIE memory aligned on a boundary equal to the maximum number of VFs below said PHB times said VF BAR space size.

18. The computer system as recited in claim 16 includes said system configuration firmware utilizing a VF BAR Stride within an SRIOV adapter to reduce the number of MDDs required to map SRIOV VF BAR spaces.

19. The computer system as recited in claim 16 includes utilizing a VF BAR Stride Capability structure in the configuration space of an SRIOV PF.

20. The computer system as recited in claim 16 includes said system configuration firmware utilizing a VF BAR Stride further and providing a predefined value in said MDD, said predefined value indicating a number of BAR domains, said predefined value divides the MDD PCI memory region into said number of groups of MMIO domains, wherein each said group contains a predefined number of MMIO domains.

21. A computer program product for implementing PCI-Express (PCIE) memory domains for single root virtualized devices in a computer system, said computer program product tangibly embodied on a non-transitory computer readable storage medium, said computer program product including instructions stored on said non-transitory computer readable storage medium, said processor executing said instructions to cause the computer system to perform the steps of:
   using a memory mapped IO (MMIO) domain descriptor (MDD) and an MMIO Domain Table (MDT) to associate MMIO domains with PCI memory Virtual Function (VF) Base Address Register (BAR) spaces;
   providing one said MDD for each unique VF BAR space size per bus segment connecting a single root IO virtualization (SRIOV) device to a PCI host bridge (PHB);
   providing in said MDD a base address register defining the starting address in PCIE memory of a set of contiguous MMIO domains; and
   providing in said MDD a programmable register containing an integer value, n, for dividing the totality of the PCIE memory address space determined by the Base Address Register into n MMIO domains of size 1/nth of said region size.

22. The computer program product as recited in claim 21 includes providing said MDD within a pool of MDDs in said PHB.

23. The computer program product as recited in claim 21 includes utilizing system configuration firmware, configuring an SRIOV Physical Function (PF) into Virtual Functions (VFs) on a PCI bus segment.

24. The computer program product as recited in claim 23 includes limiting the size of said MDT to only the number of SRIOV VFs, said size corresponding to a number of entries comprising that MDT.

25. The computer program product as recited in claim 23 includes utilizing a VF BAR Stride to reduce the number of MDDs required to map SRIOV VF BAR spaces.

26. The computer program product as recited in claim 25 includes utilizing a VF BAR Stride Capability structure in the configuration space of an SRIOV PF.

* * * * *